Oct. 23, 1928.                                          1,688,424
E. J. KIEFER
HOLDER FOR GLASSWARE, ETC
Filed April 25, 1925
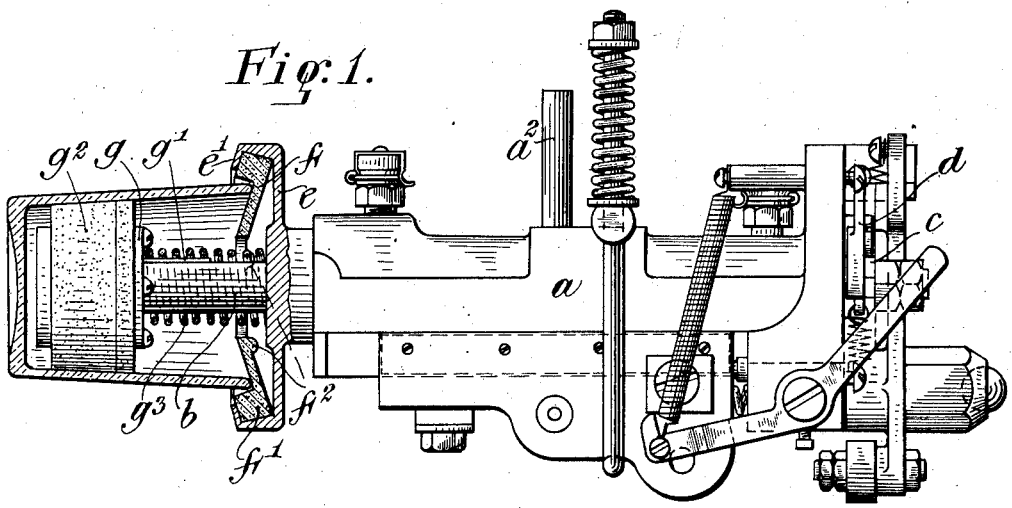
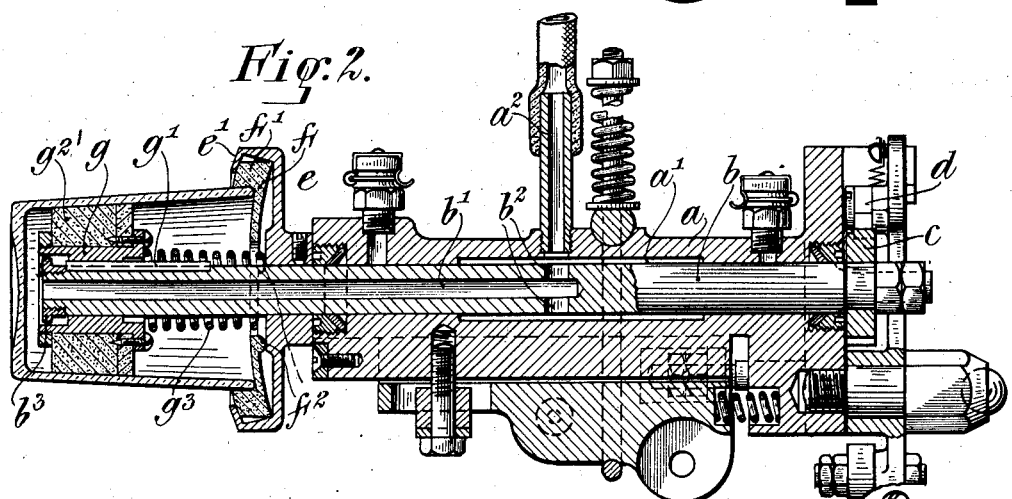
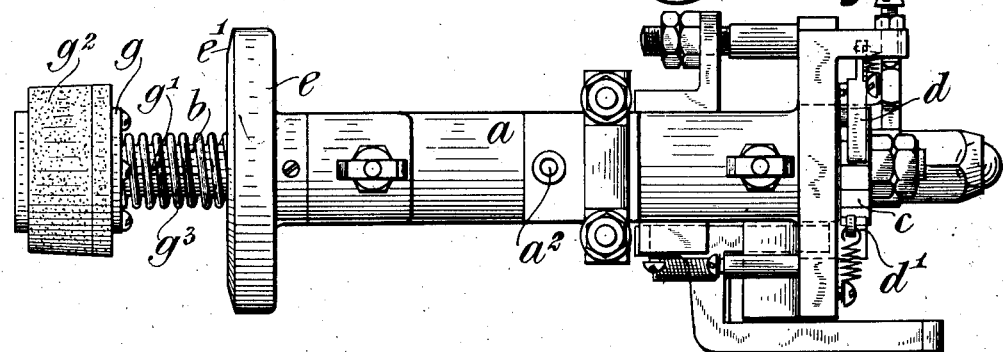

Patented Oct. 23, 1928.

1,688,424

UNITED STATES PATENT OFFICE.

EDWARD J. KIEFER, OF KEW GARDENS, NEW YORK.

HOLDER FOR GLASSWARE, ETC.

Application filed April 25, 1925. Serial No. 25,736.

In Letters Patent of the United States No. 1,502,990 issued July 29, 1924, there is shown and described a glass cutting machine designed particularly for the cutting of ornamentation on table glassware, such as tumblers. In the machine shown in that patent the tumbler to be subjected to the action of the machine is fixed on the spindle with which it rotates and with which it revolves about the grinder, through the medium of a form of chuck or holder which comprises a disc-like member secured to the rotating spindle and against which the edge of the tumbler is pressed through a yoke or frame, and a presser manipulated by the operator to press upon the bottom of the tumbler and hold it in place during the operations performed thereon. Even with a chuck or holder of this description, which must be manipulated by the operator in the placing and removal of each tumbler, the capacity of the machine shown in that patent is very great, but in the practical operation of that machine it has been found desirable to provide other means for securing the tumbler or other glassware in position which shall hold the glassware automatically when it has been placed in position by the operator and moreover shall not require mechanical pressure to be applied to the bottom of the glassware, so that the danger of breakage shall be eliminated, particularly in operations on stemmed glassware, which cannot be handled without considerable breakage when a mechanical presser must be applied to the foot of the glassware. The object of the present invention is to provide a holder for glassware which shall receive freely the glassware when it is placed in position by the operator, shall hold it firmly and without danger of breakage during the operations thereon, and shall hold the glassware at its edge only, requiring the application of no mechanical presser to the bottom or foot of the glassware. In accordance with the invention there is provided a flanged, flexible receiver, properly supported, which receives freely the edge of the glassware to be operated upon, when it is placed in position by the operator, and is flexed when the glassware is pressed against it, preferably by atmospheric pressure, so as to cause the flange to grip the edge of the glassware and hold it properly during the operations thereon. The invention will be explained more fully hereinafter with reference to the accompanying drawing in which it is illustrated and in which—

Figure 1 is a view in side elevation, partly in section, of a chuck or holder which embodies the invention and is adapted for use in a machine of the character of that shown in said Letters Patent.

Figure 2 is a view of the same in longitudinal section.

Figure 3 is a view of the same as seen from above in Figure 1, the glassware which is shown in Figures 1 and 2 being omitted from Figure 3.

The embodiment of the invention illustrated in the drawing is adapted particularly for use in connection with the machine shown in the Letters Patent above mentioned, but it will be understood that the invention is applicable to other purposes and that holders constructed in accordance with the invention can be used wherever glassware, whether stemmed or not, is to be held in position for operation of any kind thereon. In the embodiment of the invention illustrated a bracket $a$ receives a spindle $b$ which may be rotated, substantially as in the machine shown in said Letters Patent, through the medium of a ratchet wheel $c$ and pawls $d$, $d'$. The spindle $b$ preferably has through a portion of its length a central bore $b'$ open at the end of the spindle, and having ports $b^2$ for communication through a chamber $a'$ in the bracket $a$, with a connection indicated at $a^2$ to an air exhauster of any suitable character.

Fixed upon the spindle, to rotate therewith, is a cupped disc-like supporter $e$ preferably having an inwardly turned lip $e'$, to retain a flexible receiver $f$, which may be made of rubber, formed with a heavy flange $f'$ and preferably concaved normally as shown most clearly in Figure 1, so that the heavy flange $f'$ shall be turned out away from the axis so as to afford free entrance for the edge of the glassware to which the receiver is suited in diameter. The receiver may also be provided on its rear face with one or more bosses $f^2$ to prevent adhesion of the receiver to the supporter $f$ when suction is applied.

Also mounted on the spindle $b$, so as to rotate therewith but to be capable of limited longitudinal movement thereon, is a centering head which may comprise a metal sleeve $g$, splined on the spindle, as at $g'$, and a ring $g^2$, of suitable material, such as cork, which is suitably shaped and of such diameter as to fit somewhat snugly within the glassware to be operated upon. A spring $g^3$, acting against the sleeve $g$ and the supporting disc $e$, presses the centering head with gentle force away from the supporting disc $e$, its movement being limited by a flanged ring $b^3$ threaded on the end of the spindle.

In the use of the improved chuck or holder the glassware to be operated upon, whether stemmed or otherwise, is applied to the holder as shown in Figure 1, the receiver being then in the position shown in Figure 1 so that the edge of the glassware is received freely within the flange $e'$. When suction is applied through the connection $a^2$ and, by atmospheric pressure on the glassware, the receiver, with the glassware, is moved to the position shown in Figure 2, the glassware is thereby held securely to the spindle for the performance of such operations as may be desired. When the desired operations have been completed the partial vacuum within the glassware is relieved and the glassware is then removed by the operator. It will be seen that the glassware can thus be applied and removed easily and quickly and that there is no mechanical presser to cause breakage. It will be understood that the receiver and the centering head are suited in form and diameter and space relation to the shape and size of the glassware to be operated upon and that the cupped supporter for the receiver is likewise suited to the receiver. Other changes can be made to suit different conditions of use and, except as pointed out in the claims, the invention is not limited to the particular construction shown and described herein.

I claim as my invention:

1. A holder for hollow articles, comprising a flexible, flanged receiver, means for causing the sides of the flange to diverge outwardly normally, means to support the receiver, and means to press the article against the receiver to cause the flange sides to converge outwardly to cause the flange to grip the edge of the article.

2. A holder for hollow articles, comprising a flexible, flanged receiver, means to support the same, means to exhaust the air from the article to cause the same to press against the receiver to cause the flange to grip the edge of the article and means within the article to effect the centering thereof.

3. A holder for hollow articles, comprising a flexible, flanged and generally convexed receiver, means to support the same, and means to press the article against the convexed portion of the receiver adjacent the flange whereby the pressure on the receiver will cause the convexity thereof to be decreased and cause the flange to grip the edge of the article.

4. A holder for hollow articles, comprising a flexible, flanged convexed receiver, means to support the same, and means to exhaust the air from the article to cause the same to press against the convexed portion of the receiver adjacent the flange whereby the pressure on the receiver will cause the convexity thereof to be decreased and cause the flange to grip the edge of the article.

5. A holder for hollow articles, comprising a flexible, flanged receiver, a cupped and inwardly flanged supporter to retain the receiver, and means to press the article against the receiver to cause the flange to grip the edge of the article.

6. A holder for hollow articles, comprising a spindle, a cupped, disc-like supporter mounted on the spindle to rotate therewith, a flexible, flanged disc-like receiver carried within the cup, and means to press the article against the receiver to cause the flange to grip the edge of the article.

7. A holder for hollow articles, comprising a hollow spindle, a connection therefrom to an air exhauster, a cupped, disc-like supporter mounted on the spindle to rotate therewith, a flexible, flanged disc-like receiver supported thereby, and means to press the article against the receiver to cause the flange to grip the edge of the article.

8. A holder for hollow articles, comprising a hollow spindle, a connection therefrom to a receiver, a cupped, disc-like supporter mounted on the spindle to rotate therewith, a flexible, flanged receiver supported thereby, and a spring pressed head mounted on the spindle to rotate therewith and to move longitudinally thereon.

This specification signed this 24th day of April, A. D. 1925.

EDWARD J. KIEFER.